(12) United States Patent
Bennett et al.

(10) Patent No.: US 7,932,959 B2
(45) Date of Patent: Apr. 26, 2011

(54) PARALLEL TELEVISION DOCKING ADAPTER

(75) Inventors: James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1094 days.

(21) Appl. No.: 11/289,848

(22) Filed: Nov. 30, 2005

(65) Prior Publication Data

US 2007/0124778 A1    May 31, 2007

(51) Int. Cl.
*H04N 5/44* (2011.01)
(52) U.S. Cl. .............. 348/734; 348/552; 348/14.05; 348/825; 348/836; 725/141; 340/815.82
(58) Field of Classification Search .......... 348/734, 348/552, 730, 836, 838, 839, 14.05, 14.04, 348/825; 340/426.13, 815.6, 815.82; 725/80, 725/81, 141, 153
See application file for complete search history.

(56) References Cited

U.S. PATENT DOCUMENTS

2008/0221715 A1* 9/2008 Krzyzanowski et al. ....... 700/90
* cited by examiner

*Primary Examiner* — Jefferey Harold
*Assistant Examiner* — Jean W Désir
(74) *Attorney, Agent, or Firm* — McAndrews, Held & Malloy, Ltd.

(57) ABSTRACT

A docking adapter that interacts with an entertainment system and a parallel television device. The docking adapter may comprise a housing shaped for removable insertion of the parallel television device. The docking adapter may deliver power to the parallel television device. The docking adapter may comprise a communication pathway that carries media flow disposed on the housing. At least one module may receive a user input identifying a video selection. The communication pathway may carry the user input to the parallel television device. The parallel television device may generate a control signal that causes display of video information corresponding to the video selection on the entertainment system. The docking adapter may alternately or in addition receive the video information for display on a built-in screen of the docking adapter. The docking adapter may also deliver the video for display on a screen of the parallel television device.

23 Claims, 10 Drawing Sheets

PARALLEL TELEVISION DOCKING ADAPTER

CROSS-REFERENCE TO RELATED APPLICATIONS/INCORPORATION BY REFERENCE

The present application is related to U.S. patent application Ser. No. 11/290,974, filed Nov. 30, 2005, titled "PARALLEL TELEVISION REMOTE CONTROL," U.S. patent application Ser. No. 11/290,297, filed Nov. 30, 2005, titled "CONTROL DEVICE WITH LANGUAGE SELECTIVITY," U.S. patent application Ser. No. 11/289,971, filed Nov. 30, 2005, titled "PHONE BASED TELEVISION REMOTE CONTROL," and U.S. patent application Ser. No. 11/290,079, filed Nov. 30, 2005, titled "UNIVERSAL PARALLEL TELEVISION REMOTE CONTROL," each of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

1. Field of the Invention

Various aspects of the present invention relate to providing mechanical support and electrical interfaces to a remote control that controls delivery of multimedia information to a multimedia display system.

2. Description of the Related Art

A remote control device is used to control settings and display on an entertainment system from a remote location. The remote control device typically has a set of predefined buttons. A user receives visual information from a screen of the entertainment system, makes a choice and presses the buttons to realize the choice. Operating a remote control device may be inconvenient, for example, because a user generally looks back and forth between the remote buttons and the screen to complete a task.

The remote control device generally sends a control signal to the entertainment system using infrared or RF transmission. The entertainment system may typically be a television system, a home theater, a personal computer, a DVD player with a screen, etc. The remote control device needs a line-of-sight path between it and the entertainment system in case of infrared transmission. For RF transmission, the line-of-sight path is not necessary. In both cases the range of transmission is restricted to only few meters.

The user holding the remote control device may control the entertainment system from a location where the entertainment system is not visible by sending the control signal via the RF transmission. However this also ensures that the user cannot visually interact with the screen of the entertainment system. The user might not see video displayed on the screen of the entertainment system and hear audio played in a speaker of the entertainment system.

The remote control device runs on a battery. It might not be possible to put particular functionality into the remote control device keeping in view power consumed by the particular functionality. For example, specific functionality that consumes a large amount of power might not be integrated into the Remote control device.

Further limitations and disadvantages of conventional and traditional approaches will become apparent to one of ordinary skill in the art through comparison of such systems with various aspects of the present invention.

BRIEF SUMMARY OF THE INVENTION

A docking adapter that interacts with a television system and/or a media source and a remote control device that controls settings and display of video on a screen of the television system, substantially as shown in and/or described in connection with at least one of the figures, as set forth more completely in the claims. These and other advantages, aspects and novel features of the present invention, as well as details of illustrative aspects thereof, will be more fully understood from the following description and drawings.

BRIEF DESCRIPTION OF THE DRAWINGS

For various aspects of the present invention to be easily understood and readily practiced, various aspects will now be described, for purposes of illustration and not limitation, in conjunction with the following figures.

DETAILED DESCRIPTION

Figure 1:
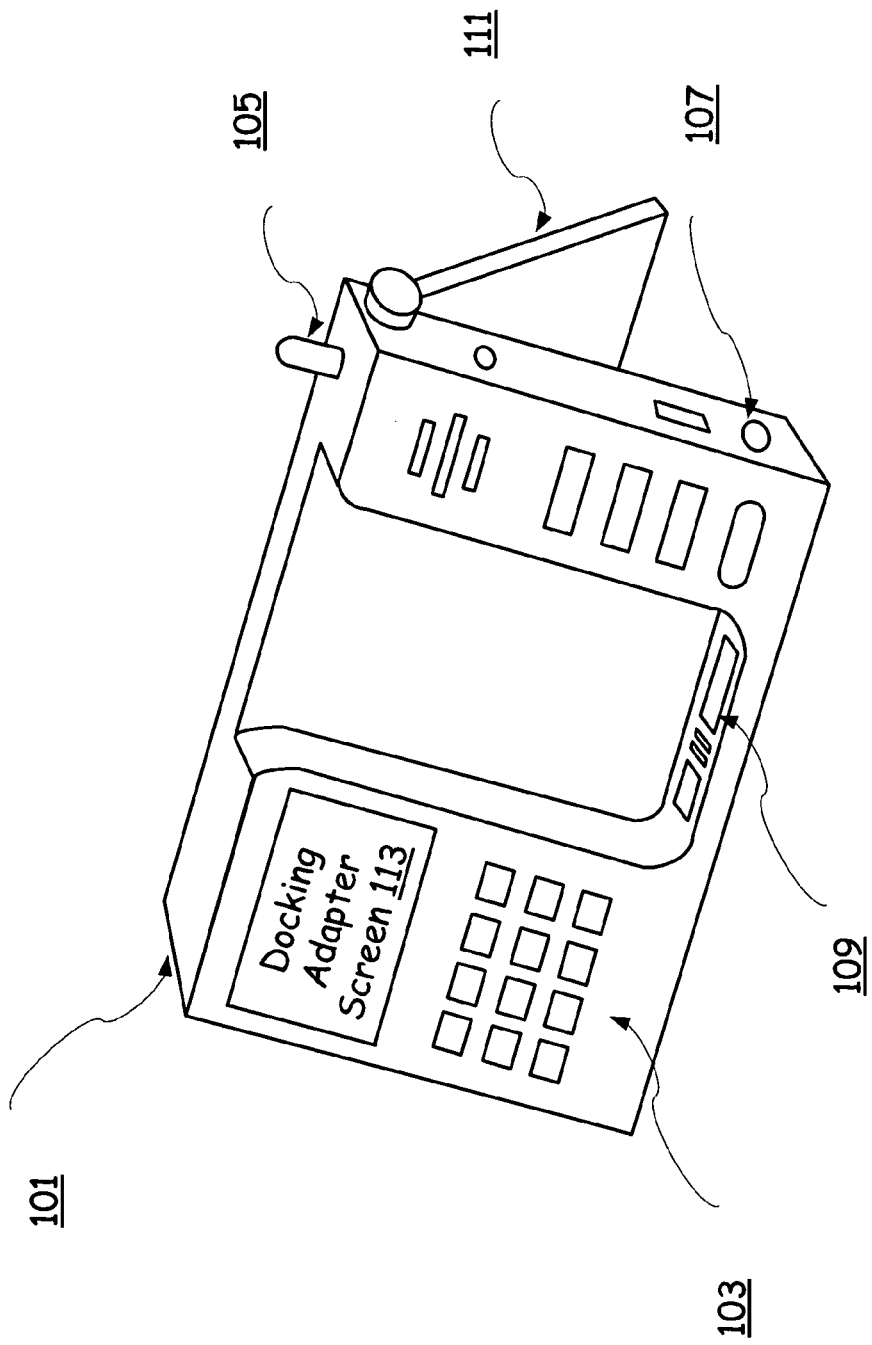
FIG. 1 is a perspective diagram illustrating a docking adapter, having a user input interface and a plurality of communication interfaces, that interacts with a parallel television in accordance with various aspects of the present invention.

FIG. 1 is a perspective diagram illustrating a docking adapter 101 having a user input interface 103 and a plurality of communication interfaces, 105, 107 and 109. The docking adapter 101 interacts with a parallel television. The user input interface 103 comprises a plurality of buttons. The user input interface 103 in another embodiment, for example and without limitation, comprises one or more of a thumbwheel, a mouse, a touchpad, a microphone and a pen. The docking adapter 101 comprises a housing shaped for removable insertion of the parallel television. The docking adapter 101 with the parallel television inserted into the docking adapter 101 is laid at an inclined position by using a support 111. The docking adapter 101 gets communicatively coupled to the parallel television via communication interface 109 when the parallel television is inserted into the docking adapter 101.

A television has a first screen. The parallel television has a second screen. In the illustrated example, the parallel television is generally a remote control device that may be utilized to selectively display a channel guide, a first television channel and a second television channel. Note however, that the parallel television may comprise characteristics of any of a variety of devices that may be utilized with a television. Non-limiting examples of such devices are discussed in U.S. patent application Ser. No. 11/290,974, filed Nov. 30, 2005, titled "PARALLEL TELEVISION REMOTE CONTROL," and U.S. patent application Ser. No. 11/289,971, filed Nov. 30, 2005, titled "PHONE BASED TELEVISION REMOTE CONTROL," each of which are incorporated herein by reference in their entirety. Selection of the first television channel and the second television channel may be based on the channel guide. The parallel television sends a control signal to the television. The control signal triggers the television to receive the first television channel directly or indirectly from a television channel broadcaster (or transmitter) and display the first television channel on the first screen of the television. The parallel television receives the channel guide and the second television channel, at a same time or at different times, directly and/or indirectly, from the television channel broadcaster. The channel guide and the second television channel are displayed on the second screen of the parallel television.

The parallel television, when inserted into the docking adapter 101, gets communicatively coupled to the docking adapter 101 via the communication interface 109. Communication pathways laid within the docking adapter 101 transport the control signal from the inserted parallel television to the television. The docking adapter 101 interacts with the television channel broadcaster via a wireless communication interface 105. The communication pathways of the docking adapter 101 carry and deliver the channel guide and the second television channel directly and/or indirectly from the television channel broadcaster to the parallel television. The docking adapter 101 communicates with the television via a wired communication interface 107.

The docking adapter 101 comprises a docking adapter screen 113. The docking adapter 101 displays the channel guide and the second television channel on the docking adapter screen 113.

Figure 2:
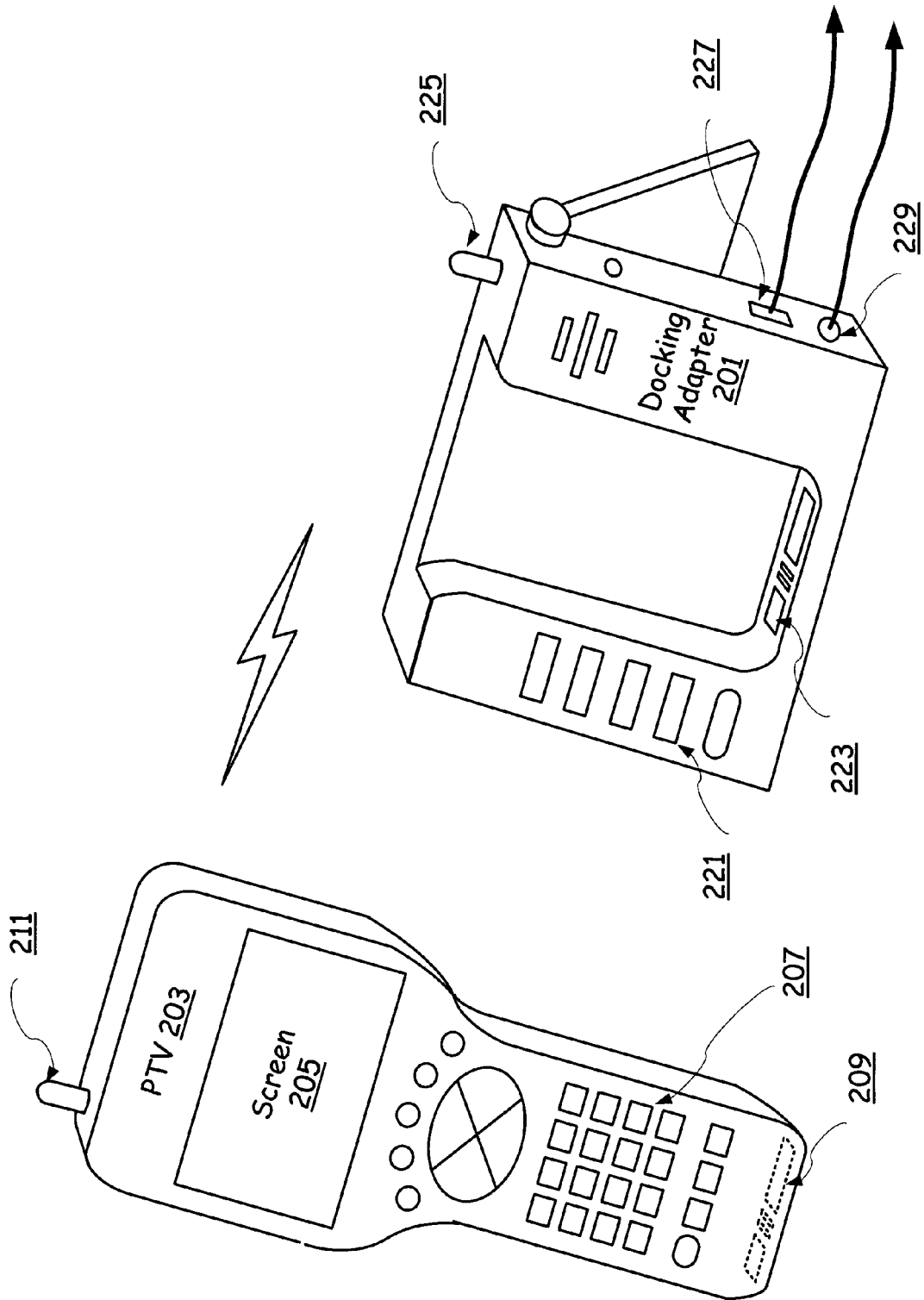
FIG. 2 is a perspective diagram of a parallel television and the docking adapter of FIG. 1 illustrating engagement and wired and wireless interaction therebetween.

FIG. 2 is a perspective diagram of a parallel television 203 and a docking adapter 201, which is similar in various aspects to the docking adapter 101 of FIG. 1, illustrating engagement and wired and wireless interaction therebetween. The parallel television 203 comprises a PTV screen 205, a PTV user input interface 207, a docking adapter interface 209 and a PTV wireless interface 211. The docking adapter 201 comprises a user input interface 221, a PTV interface 223, a wireless interface 225, a first wired interface 227 and a second wired interface 229. The docking adapter 201 responds to the parallel television 203 via the PTV wireless interface 211 and the wireless interface 225. The docking adapter 201 is communicatively coupled to a television directly or indirectly, for example, via a set top box, through the first wired interface 227. The docking adapter 201 reaches out to a television channel broadcaster through a second wired interface 229.

The PTV user input interface 207 receives a user input. The PTV user input interface 207 comprises a plurality of buttons and a thumbwheel. The user input interface 207 in some embodiments, for example and without limitation, comprises one or more of a mouse, a touchpad, a voice based input (or microphone) and a pen. The user input identifies a first television channel and a second television channel. Subsequently, the parallel television 203 sends a control signal to the docking adapter 201 via the PTV wireless interface 211. The docking adapter 201 receives the control signal via the wireless interface 225. Communication pathways are laid within the docking adapter 201. The communication pathways carry the control signal from the wireless interface 225 to the first wired interface 227. The docking adapter 201 transports the control signal to the television to which it communicates via the first wired interface 227. The television has a television screen (e.g., a video display). The control signal actuates the television to receive the first television channel directly or indirectly, for example, via the set top box, from the television channel broadcaster and display the first television channel on the television screen. The control signal also triggers the docking adapter 201 to receive the second television channel from the television channel broadcaster via the second wired interface 229. The communication pathways carry the second television channel from the second wired interface 229 to the wireless interface 225. Thus, the second television channel reaches the wireless interface 225. The docking adapter 201 sends the second television channel to the parallel television 203. The parallel television 203 receives the second television channel through the PTV wireless interface 211 and displays the second television channel on the PTV screen 205.

In one embodiment, the user input interface 221 of the docking adapter 201 receives a second user input. The second user input identifies two television channels. The docking adapter 201 sends the second user input to the parallel television 203 via the wireless interface 225. The communication pathways carry the second user input from the user input interface 221 to the wireless interface 225. The parallel television receives the second user input through the PTV wireless interface 211. Subsequently, the parallel television 203 sends a second control signal to the docking adapter 201. The second control signal directs display of one of the two television channels on the television screen and display of the other of the two television channels on the PTV screen 205. The parallel television 203 controls selective display of television channels whereas the communication pathways of the docking adapter 201 transport the second user input, control signals and the television channels.

In another embodiment, the docking adapter 201 communicates with a set top box via the first wired interface 227. The television and the television channel broadcaster are communicatively coupled to the set top box. The docking adapter 201 sends the control signal to the set top box via the first wired interface 227. The docking adapter 201 receives the second television channel from the television channel broadcaster via the set top box using the first wired interface 227.

In yet another embodiment, the parallel television 203 is inserted into the docking adapter 201. The parallel television 203 gets connected to the docking adapter 201 as the docking adapter interface 209 and the PTV interface 223 come in physical contact. The control signal generated by the parallel television 203 reaches the docking adapter through the docking adapter interface 209 and the PTV interface 223. The communication pathways laid within the docking adapter 201 carry the control signal from the PTV interface 223 up to the first wired interface 227. The control signal reaches the television via a first wire inserted into the first wired interface 227. The first wire may be, for example and without limitation, an optical fiber or a coaxial cable. The docking adapter 201 gets the second television channel from the television channel broadcaster over a second wire inserted into the second wired interface 229. The second wire may be, for example and without limitation, a coaxial cable or an optical fiber. The communication pathways carry the second television channel from the second wired interface 229 up to the PTV interface 223. The parallel television 203 receives the second television channel through the PTV interface 223 and the docking adapter interface 209 and displays the second television channel on the PTV screen 205.

Figure 3:
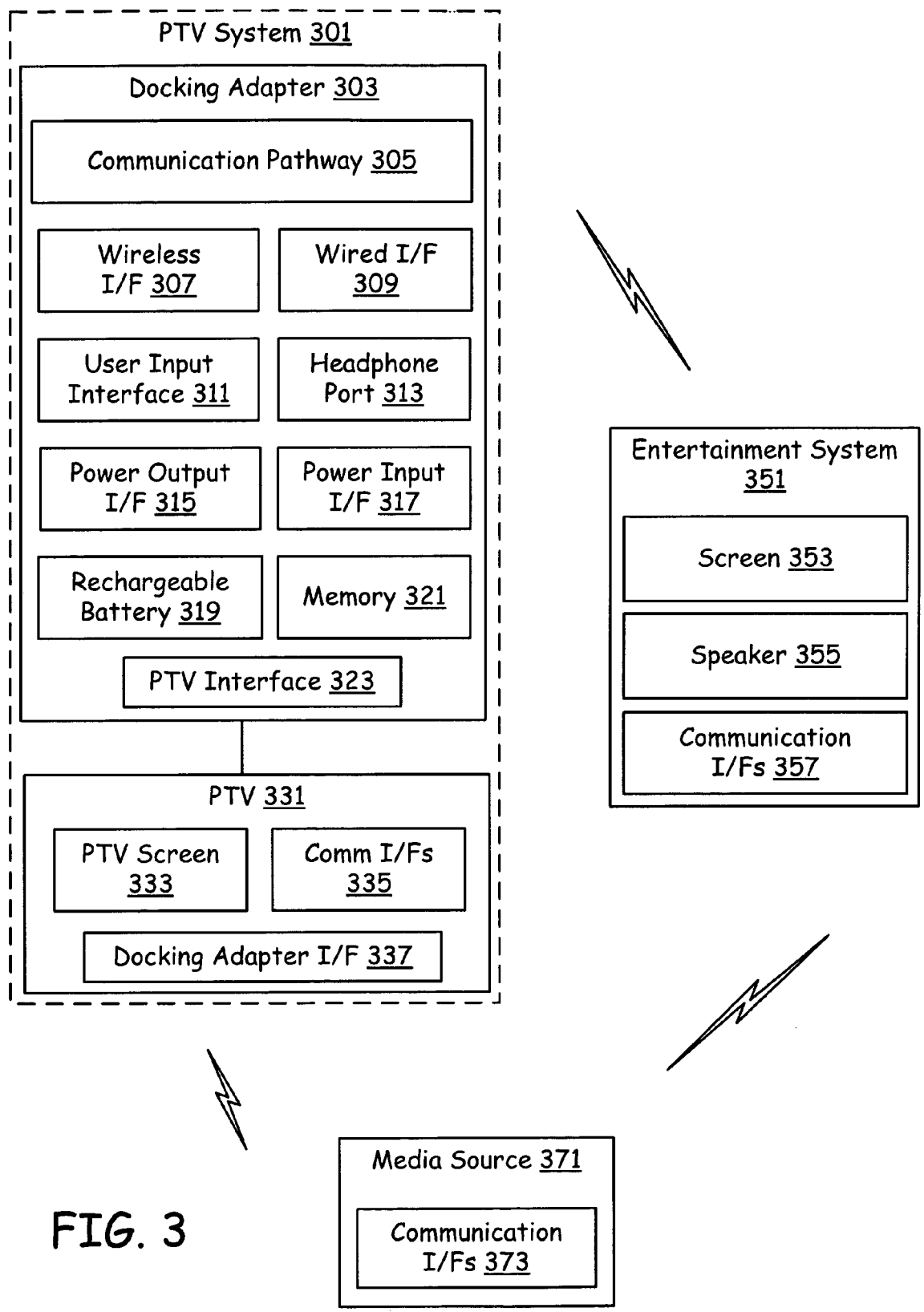
FIG. 3 is a schematic block diagram that illustrates the operation of the docking adapter and parallel television of FIG. 2 in an entertainment infrastructure that includes an entertainment system and a media source, wherein the parallel television controls settings and display on a screen of the entertainment system in accordance with one embodiment of the present invention.

FIG. 3 is a schematic block diagram that illustrates the operation of the docking adapter 201 and parallel television 203 of FIG. 2 in an entertainment infrastructure that includes an entertainment system 351 and a media source 371, wherein the parallel television 331 controls settings and display on a screen 353 of the entertainment system 351. The parallel television 331 and docking adapter 303 are, in this non-limiting exemplary scenario, located at a first premises and the media source 371 is located at a second premises. The entertainment system 351 may be located at a third premises. In some embodiments the entertainment system 351 may be located at the first premises. The entertainment system 351 comprises a screen 353, a speaker 355 and communication interfaces 357. The entertainment system 351 interacts with the media source 371, the parallel television 331 and the docking adapter 303 over two separate links. Each of the two separate links may comprise characteristics of any of a variety of communication link types, for example, optical fiber, coaxial cable, Ethernet cable, infrared, Bluetooth, IEEE 802.11 (or other wireless local area network standard), IEEE 802.15 (or other wireless personal area network standard), cellular telephony (e.g., GSM/GPRS/EDGE, CDMA, CDMA2000, UMTS, WCDMA, etc.), UltraWideBand, standard/proprietary, etc. The entertainment system 351 may be, for example and without limitation, a television, a home theater, a DVD player, a PVR, a camcorder, a video game box and a personal computer.

The media source 371 responds to the parallel television 331 and the entertainment system 351 via communication interfaces 373. The media source 371 is communicatively coupled to the parallel television 331 over one or more of a, for example and without limitation, a satellite link, a microwave link, a radio frequency link, a Bluetooth link, an Internet, an Intranet and an infrared link. The media source may be any of a television channel broadcaster, an Internet server, an Intranet server, a DVD, a camcorder, a video camera and a photo camera. The parallel television 331 comprises a PTV screen 333, communication interfaces 335 and a docking adapter interface 337. The parallel television 331 communicates with the media source 371, the entertainment system 351 and the docking adapter 303. The docking adapter 303 comprises communication pathway 305, a wireless interface 307, a wired interface 309, a user input interface 311, a headphone port 313, a power output interface 315, a power input interface 317, a rechargeable battery 319, a memory 321 and a PTV interface 323. The docking adapter 303 reaches out to the media source 371 and the entertainment system 351 via one the wireless interface 307 and the wired interface 309 respectively. The docking adapter 303 may, for example, use the wireless interface 307 for the entertainment system 351 and the wired interface 309 for the media source 371. In some embodiments the docking adapter 303 may have more than one wired and/or wireless interfaces, such that the entertainment system 351 and the media source 371 connects to the docking adapter 303 either via the wired interfaces 309 or via the wireless interfaces 307. The parallel television 331 and the docking adapter 303 respond to each other via the PTV interface 323 and the docking adapter interface 337.

The docking adapter 303, when connected to a power supply via the power input interface 317, charges the rechargeable battery 319. The docking adapter 303 may alternately or in addition deliver power to the parallel television 331 via the power output interface 315 if the power input interface 317 is connected to the power supply. The docking adapter 303 may also supply power to the parallel television 331 from the rechargeable battery 319. The user input interface 311 receives a user input. The communication pathway 305 laid inside chassis of the docking adapter 303 carries the user input from the user input interface 311 up to the PTV interface 323. The parallel television 331 gets the user input via the docking adapter interface 337. The user input identifies a first media element and a second media element that are available with the media source 371. The first media element and the second media element may generally comprise characteristics of any of a variety of selectable units of media information (e.g., multimedia information). For example and without limitation, a media element may comprise characteristics of a movie, music video, television program, television channel, sporting or other entertainment event, news report, a picture, computer game or any of a variety of units of recorded or live multimedia information.

By way of example and without limitation, the first media element is a first movie, the second media element is a second movie, and the media source 371 is a television channel broadcaster. The docking adapter 303 is communicatively coupled to the media source 371 via the wired interface 309 and to the entertainment system 351 via the wireless interface 307. Upon receiving the user input, the parallel television 331 generates a control signal meant for the entertainment system 351 and sends the control signal to the docking adapter 303. The communication pathway 305 transports the control signal from PTV interface 323 up to the wireless interface 307 and the control signal reaches the entertainment system 351 via a wireless link. The control signal directs the entertainment system 351 to receive the first movie (the first media element) from the television channel broadcaster (the media source 371) and display on the screen 353. The control signal triggers the docking adapter 303 to receive the second movie (the second media element) from the television channel broadcaster (the media source 371) and carry the second movie up to the PTV interface 323 via the communication pathway 305. The parallel television 331 receives the second movie via the docking adapter interface 337 and displays the second movie on the PTV screen 333.

The user input may alternately specify a setting perusal request. The parallel television 331 sends another control signal to the entertainment system 351 via the docking adapter 303 triggering display of screen settings and speaker settings of the entertainment system 351 on the PTV screen 333. A user interacts with the parallel television 331 visually. The user input interface 311 of the docking adapter 303 subsequently receives another user input and carries the user input to the parallel television 331 using the communication pathway 305. The user input prompts the parallel television 331 to send yet another control signal to the entertainment system 351 via the docking adapter 303 triggering change in the screen setting and/or the speaker settings of the entertainment system 351.

Figure 4:
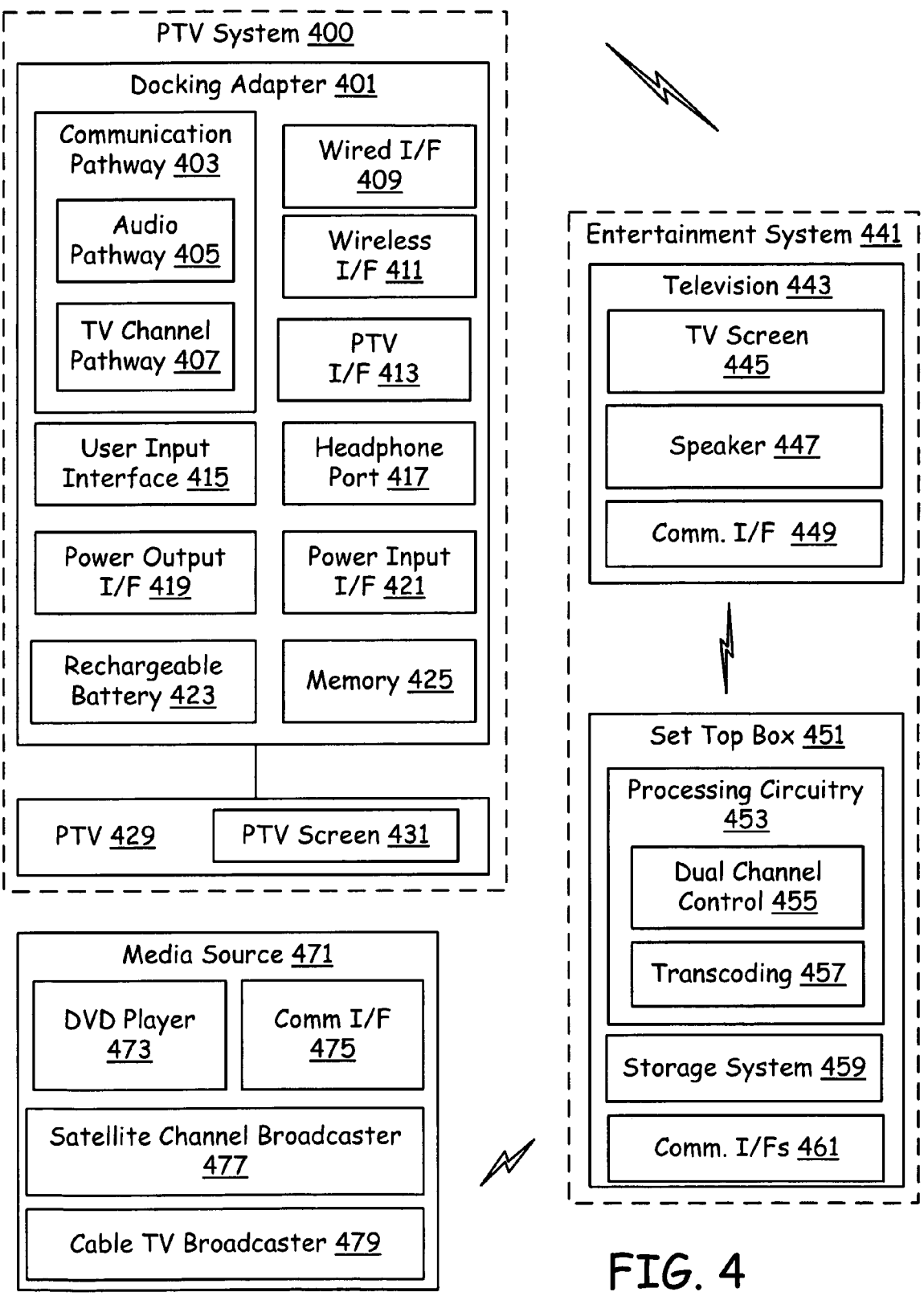
FIG. 4 is a schematic block diagram illustrating another embodiment of the docking adapter of FIG. 2 in an entertainment infrastructure, wherein the docking adapter further supports interaction of the parallel television with a television via a set top box that is housed with the television in an entertainment system.

FIG. 4 is a schematic block diagram illustrating another embodiment of the docking adapter 201 of FIG. 2 in an entertainment infrastructure, wherein the docking adapter 401 further supports interaction of the parallel television 429 with a television 443 via a set top box 451 that is housed with the television 443 in an entertainment system 441. The television 443 comprises a TV screen 445, a speaker 447 and a communication interface 449 via which the television 443 communicates with the set top box 451. The television 443 communicates with the set top box 451 through any one of, for example, an infrared link, a Bluetooth link, a wired link, an IEEE 802.11 link, etc. The set top box 451 comprises processing circuitry 453 (e.g., which may comprise various hardware and/or software modules), a storage system 459 and communication interfaces 461. The set top box 451 responds to a PTV system 400 and a media source 471 via the communication interfaces 461 over a wireless link and/or a wired link. The media source 471 may be, for example and without limitation, a DVD player 473, a satellite channel broadcaster 477 or a cable TV broadcaster 479.

The PTV system 400 comprises a parallel television 429 and a docking adapter 401. The user input interface 415 of the docking adapter 401 receives a media guide perusal input from a user. The docking adapter 401 sends the media guide perusal input to the parallel television 429 via the communication pathway 403. The parallel television 429, on receiving the media guide perusal input, sends a first control signal to the set top box 451. The docking adapter 401 carries the first control signal from the parallel television 429 up to the wired interface 409 if the set top box 451 is connected to the PTV system 400 over the wired link, or up to the wireless interface 411 if the set top box 451 is connected to the PTV system 400 over the wireless link. The first control signal triggers the set top box 451 to receive a media guide from the media source 471 and deliver the media guide to the PTV system 400. In some embodiments the media guide may be available with a source other than the media source 471. In such non-limiting cases the set top box 451 receives the media guide from the source and sends the media guide to the PTV system 400. By way of example, the media source 471 is a satellite channel broadcaster 477. The channel guide identifies a plurality of television channels available with the satellite channel broadcaster 477. The docking adapter 401 carries the media guide received via the wired interface 409 or the wireless interface 411 to the parallel television 429 through the communication pathway 403. The parallel television 429 displays the media guide on PTV screen 431.

In another embodiment, the first control signal triggers the set top box 451 to retrieve the media guide and deliver the media guide to the television 443 for display on the TV screen 445. A user interacts with the television 443 visually. The user input interface 415 of the docking adapter 401 subsequently receives a media selection that identifies a first television channel and a second television channel from the plurality of television channels. The docking adapter 401 sends the media selection to the parallel television 429 via the communication pathway 403. The parallel television 429, on receiving the media selection, sends a second control signal to the set top box 451. The second control signal directs the set top box 451 to receive the first television channel from the satellite channel broadcaster 477 and deliver the first television channel to the television 443 for display on the TV screen 445. The second control signal also prompts the set top box 451 to receive the second television channel from the satellite channel broadcaster 477 and send the second television channel to the PTV system 400. The docking adapter 401 receives the second television channel via the wired interface 409 if the set top box 451 is communicatively coupled to the wired interface 409 or via the wireless interface 411 if the set top box 451 is communicatively coupled to the wireless interface 411. The docking adapter 401 carries the second television channel through TV channel pathway 407 up to the PTV interface 413 from where the parallel television 429 carries the second television channel and displays the second television channel on the PTV screen 431. The communication pathway 403 of the docking adapter 401 is adapted to carry video information (e.g., a video part of the second television channel), audio information (e.g., an audio part of the second television channel) and data information (e.g., the first control signal and the second control signal).

The set top box 451 comprises dual channel control circuitry 455 to be able to receive the first television channel and the second television channel from the satellite channel broadcaster 477. The set top box circuitry comprises a transcoding unit 457. The TV screen 445 supports media in television format (i.e., a format that is prescribed for the TV screen 445, for example, HDTV (High Definition Television) format). The PTV screen 431 supports media in some other format, for example and without limitation QVGA (Quarter Video Graphics Array) format. The satellite channel broadcaster 477 sends the first television channel and the second television channel, for example, in the television format. The transcoding unit 457 of the set top box 451 converts the second television channel supplied in the television format (HDTV format) to QVGA format that is supported by the PTV screen 431 and sends the second television channel in the QVGA format to the PTV system 400.

The docking adapter 401 comprises a headphone port 417. In some embodiments a headphone is plugged into the docking adapter 401 through the headphone port 417. The docking adapter 401, after receiving the second television channel from the set top box 451, carries the audio portion of the second television channel via audio pathway 405 to the headphone port 417. The headphone picks up the audio portion of the second television channel. The video portion of the second television channel is displayed on the PTV screen 431.

Figure 5:
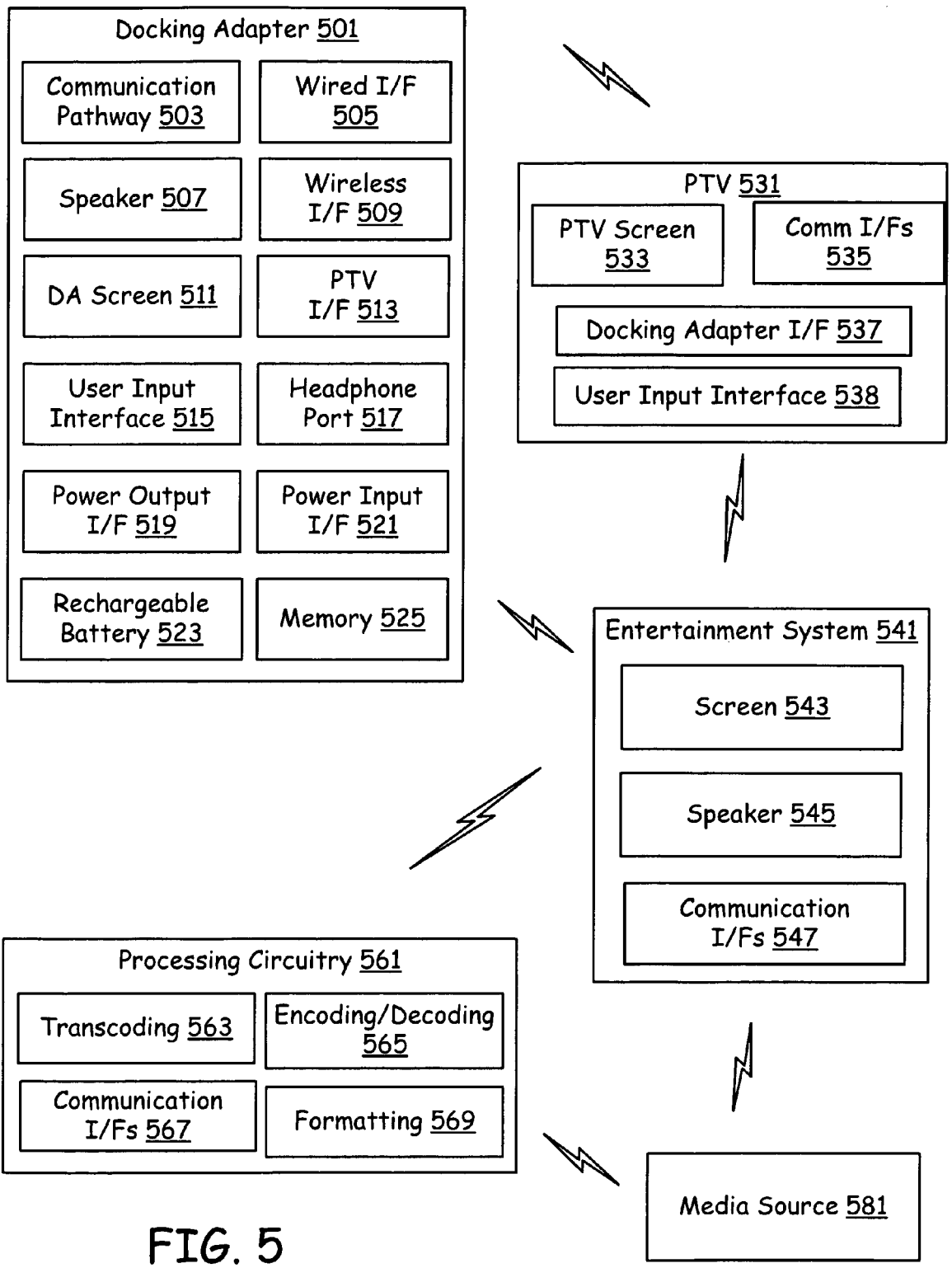
FIG. 5 is a schematic block diagram illustrating yet another embodiment of the docking adapter of FIG. 2 in an entertainment infrastructure, wherein the docking adapter has a built-in speaker and screen.

FIG. 5 is a schematic block diagram illustrating yet another embodiment of the docking adapter 201 of FIG. 2 in an entertainment infrastructure, wherein the docking adapter 501 has a built-in speaker 507 and a screen 511. The docking adapter 501 is located at a first premises. An entertainment system 541 is located at a second premises. A parallel television 531 is located at a third premises. A media source 581 is located at a fourth premises. The docking adapter 501 interacts with the entertainment system 541 and the parallel television 531. The parallel television 531 communicates with the entertainment system 541. The entertainment system 541 is communicatively coupled to the media source 581 and processing circuitry 561. In one embodiment, the processing circuitry 561 is located at the second premises. In another embodiment the processing circuitry 561 is located at the fourth premises. In yet other embodiments, the processing circuitry 561 may be located at a fifth premises. The media source 581 responds to the processing circuitry 561. The processing circuitry 561 comprises a unit that performs transcoding functionality 563, a unit that performs encoding and decoding functionality 565 and a unit that performs formatting functionality 569.

The parallel television 531 comprises a user input interface 538 and a screen 533. The parallel television 531 controls display of a plurality of media elements on a screen 543 of the entertainment system 541 and on the screen 533 of the parallel television 531. The plurality of media elements are retrieved from the media source 581. The entertainment system 541 performs retrieval functionality. The parallel television 531 generates control signals directing the entertainment system 541 to perform the retrieval functionality. The entertainment system 541 performs media rights purchasing functionality with the media source 581 if necessary to retrieve the plurality of media elements. A user input entered via the user input interface 538 of the parallel television 531 comprises selection of the plurality of media elements from a pool of media elements available with the media source 581. A menu identifying the pool of media elements is available with the parallel television 531. The parallel television 531 displays the menu on the screen 533 of the parallel television 531, and the user input is based on the menu. In one embodiment, the menu identifying the pool of media elements is retrieved by the entertainment system 541 from the media source 581 on request received via the user input interface 538 of the parallel television 531 and sent to the parallel television 531 for display on the screen 533 of the parallel television 531. In another embodiment, the menu identifying the pool of media elements is displayed on the screen 543 of the entertainment system 541. One of the plurality of media elements retrieved by the entertainment system is displayed on the screen 543 of the entertainment system 541 and/or on the screen 533 of the parallel television 531 as per the user input.

The parallel television 531 delivers the control signal and receives the plurality of media elements via the docking adapter 501 when the docking adapter 501 is pressed into action. The docking adapter 501 comprises a rechargeable battery 523 that supplies power to the parallel television 531 and the docking adapter 501. Connecting a power input interface 521 of the docking adapter 501 to an alternating or direct power supply charges the rechargeable battery 523. In some embodiments, the docking adapter 501 supplies power to the parallel television 531 through power output interface 519 while the power input interface 521 of the docking adapter 501 remains connected to an alternating or direct power supply. The docking adapter 501 comprises a communication pathway 503 that carries control signals, video signals and audio signals between different components/interfaces (e.g., wired interface 505 and wireless interface 509) of the docking adapter 501. The communication pathway 503 may be, for example and without limitation, a copper bus or optical fiber.

The communication pathway 503 of the docking adapter 501 carries the video portion of a media element identified by a user input up to the docking adapter screen 511. The docking adapter 501 displays the video portion on the docking adapter screen 511. The communication pathway 503 of the docking adapter 501 carries the audio portion of the media element up to the docking adapter speaker 507. The docking adapter 501 plays the audio portion in the docking adapter speaker 507. In another embodiment the communication pathway 503 carries the video portion up to the wired interface 505 for delivery to the parallel television 531. The parallel television 531 subsequently displays the video portion on the screen 533 of the parallel television 531. In yet another embodiment, the docking adapter 501 stores the media element in memory 525.

The screen 543 of the entertainment system 541, the screen 533 of the parallel television 531 and the docking adapter screen 511 may support different formats. For example and without limitation, the screen 543 supports HDTV format, the screen 533 supports QVGA format and the docking adapter screen 511 supports VGA format. Two media elements retrieved from media source 581 are, for example, in HDTV format. The media source 581 sends the two media elements to the processing circuitry 561, which applies appropriate formatting to the two media elements. The entertainment system 541 retrieves the two processed media elements from the processing circuitry 561 and forwards the retrieved media elements to the screen 543 and the docking adapter 501. A control signal generated by the parallel television 531 after receiving a viewer selection identifies which format to be applied to which of the two media elements. In some embodiments, the docking adapter 501 is unaware of the processing circuitry 561. The docking adapter 501 may also be unaware of the location of the media source 581 and communication protocols between the entertainment system 541 and the media source 581.

Figure 6:
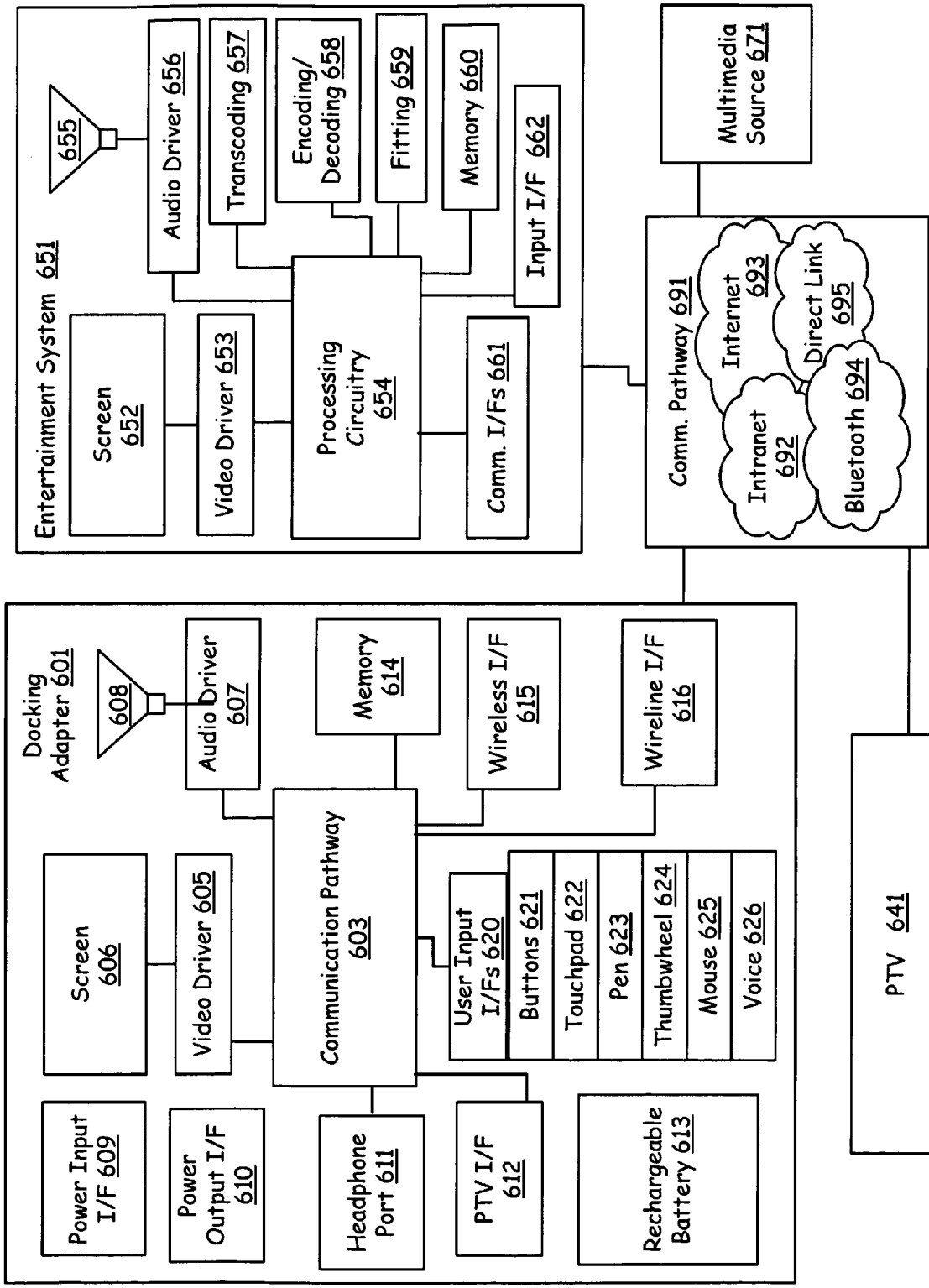
FIG. 6 is a schematic block diagram illustrating communication pathways between a docking adapter, a parallel television, an entertainment system and a multimedia source in accordance with various aspects of the present invention.

FIG. 6 is a schematic block diagram illustrating communication pathways 691 between a docking adapter 601, a parallel television 641, an entertainment system 651 and a multimedia source 671 in accordance with various aspects of the present invention. The parallel television 641 reaches out to the docking adapter 601 through an Internet link, an intranet link, a phone network, an infrared link, an IEEE 802.11 link, an IEEE 802.15 link, a copper cable, an optical fiber cable or any other standard/proprietary link. In some embodiments, the parallel television 641 gets communicatively coupled to the docking adapter 601 when the parallel television 641 is put in physical contact with the docking adapter 601. The docking adapter 601 communicates with the entertainment system 651. The entertainment system 651 may be, for example and without limitation, a television, a television with a cable channel set top box, a television with a satellite channel set top box, a personal notebook, a home theater, a video game box, a DVD player, a PVR etc. The parallel television 641 controls settings and display of media elements on screen 652 of the entertainment system 651. The parallel television 641 interacts with the entertainment system 651 via the docking adapter 601. The parallel television 641 is unaware of the type of the entertainment system 651 and protocols that may be needed for interacting with the entertainment system 651. The docking adapter 601 adapts to the protocols that may be needed for interacting with the entertainment system 651.

Figure 7:
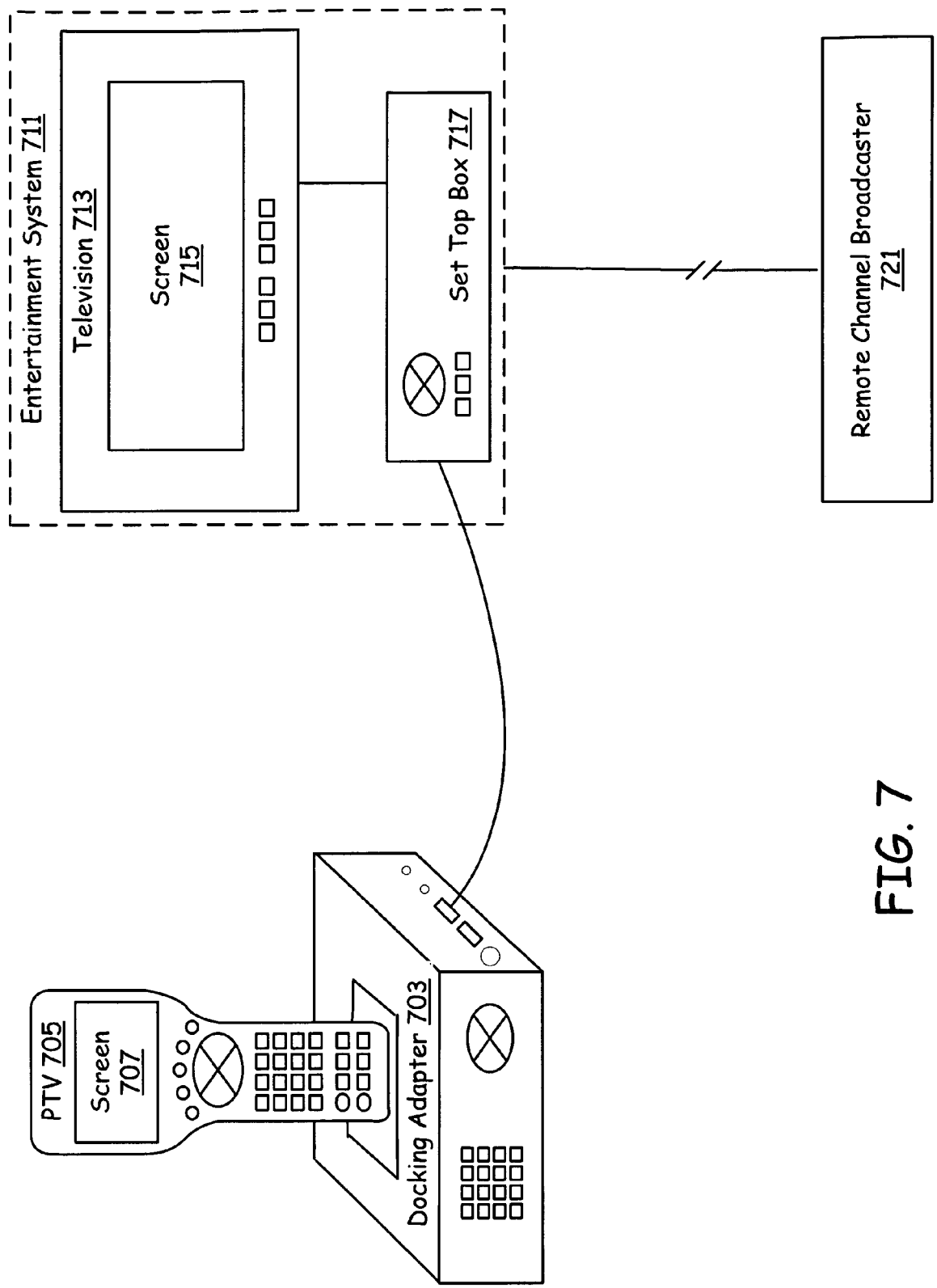
FIG. 7 is a schematic diagram illustrating a parallel television mounted on a docking adapter, wherein the parallel television controls selective display of a television channel on a television via the docking adapter that is communicatively connected to the television via a set top box in accordance with various aspects of the present invention.

FIG. 7 is a schematic diagram illustrating a parallel television 705 mounted on a docking adapter 703, where the parallel television 705 controls selective display a of television channel on a television 713 via the docking adapter 703, which communicates with the television 713 via a set top box 717. The television 713 is housed with the set top box 717 in an entertainment system 711. The entertainment system 711 and the docking adapter 703 are located at a first premises. The set top box 717 interacts with a remote channel broadcaster 721 that is situated at a second premises. The remote channel broadcaster 721 may be, for example, a cable television broadcaster or a satellite television broadcaster. The set top box 717 and the remote channel broadcaster 721 interact via a wireless link that may have characteristics of any one or more of infrared, Bluetooth, IEEE 802.11, IEEE 802.15, cellular telephony (e.g., GSM/GPRS/EDGE, CDMA, CDMA2000, UMTS, WCDMA, etc.), UltraWideBand, or any standard/proprietary link. The remote channel broadcaster 721 broadcasts a plurality of channels that are typically movie, sports program, news program, documentary, etc.

The docking adapter 703 communicates with the set top box 717 using a wired interface and over a wired link that may typically be an optical fiber, a copper wire, a twisted pair, a coaxial cable or an Ethernet cable. The docking adapter 703 is designed in a way so that the angle of mounting of the parallel television 705 on the docking adapter 703 can be varied. The parallel television 705 gets communicatively coupled to the docking adapter 703 via a communication interface of the docking adapter 703 once the parallel TV 705 is mounted on the docking adapter 703. Once mounted, the parallel television 705 communicates with the set top box 717 via the docking adapter 703.

The parallel television 705 comprises a screen 707 and a first user input interface. The docking adapter 703 comprises a second user input interface. Both the first user input interface and the second user input interface accept user input. The first and the second user interfaces may be one or a combination of a thumbwheel, a pen, a voice based interface, a touchpad, buttons, a mouse and a microphone. The docking adapter 703 comprises a communication bus, for example, a copper wire laid inside the chassis of the docking adapter 703. The communication bus carries audio, video and data and interconnects a plurality of interfaces (e.g., the second user input interface and the communication interface) of the docking adapter 703.

For example, the second user input interface receives a user input. The user input comprises a channel guide perusal request. The user input is a voice of a user. The communication bus of the docking adapter 703 carries the user input (voice) from the second user input interface to the communication interface. The user input thus reaches the parallel television 705. If the first user input receives the user input, then the communication bus of the docking adapter 703 does not carry the user input. The parallel television 705 generates a control signal using the user input and sends the control signal to the communication interface. The communication bus of the docking adapter 703 carries the control signal (data) from the communication interface to the wired interface. The control signal is next transported through the wired link to the set top box 717. The set top box 717 responds to the control signal by retrieving a channel guide from the remote channel broadcaster 721. The set top box 717 delivers the channel guide up to the wired interface of the docking adapter 703. The communication bus of the docking adapter 703 carries the channel guide (data and video) from the wired interface to the communication interface. The parallel television 705 displays the channel guide on the screen 707.

Figure 8:
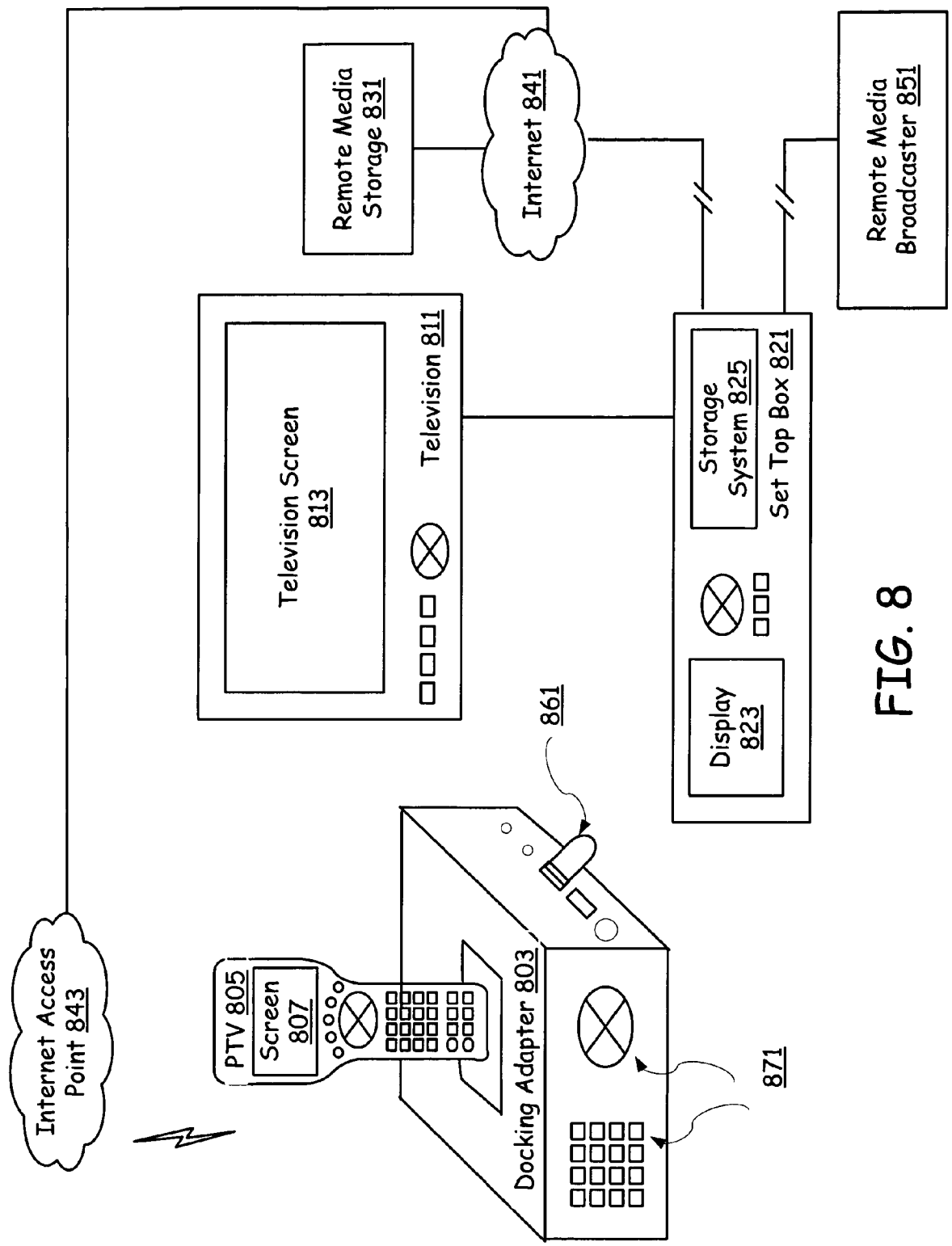
FIG. 8 is a schematic block diagram illustrating an embodiment of the docking adapter of FIG. 7 further supporting communication of the parallel television to a remote media storage that is accessible through Internet.

FIG. 8 is a schematic block diagram illustrating an embodiment of the docking adapter 703 of FIG. 7 further supporting communication of the parallel television 805 to a remote media storage 831 that is accessible via Internet 841. The parallel television 805 is mounted on the docking adapter 803 and is communicatively coupled to the docking adapter 803. The docking adapter 803 interacts with a television screen 813 indirectly via a set top box 821. The docking adapter 803 reaches the Internet 841 via Internet access point 843. The set top box 821 also communicates to the Internet 841. The docking adapter 803 sends to and receives multimedia elements from the set top box 821 via the Internet 841. A removable storage 861 lies inserted into a port of the docking adapter 803. The set top box 821 comprises a storage system 825. The set top box 821 communicates with a remote media broadcaster 851 over a wired or a wireless link. The wired link may be typically a cable or an optical fiber. The wireless link may be typically a cellular phone link, an IEEE 802.11 link, a satellite link, an IEEE 802.15 link, an infrared link, a Bluetooth link, etc. The remote media broadcaster 851 supplies a plurality of multimedia elements. The remote media storage 831 is connected to the Internet 841.

The docking adapter 803 comprises a user input interface 871. The parallel television comprises a screen 807. A user interacts visually with the screen 807 and/or the television screen 813 and enters a user input via the user input interface 871. The docking adapter 803 conveys the user input to the parallel television 805 using a communication bus laid on the parallel television 805 chassis. The parallel television 805 reads the user input and returns a control signal. The user input may typically identify at least one multimedia element from the plurality of multimedia elements and a corresponding device. For example and without limitation, the user input identifies a first multimedia element from the plurality of multimedia elements and the parallel television 805. The docking adapter 803 receives the control signal from the parallel television 805 and sends it to the set top box 821 via the Internet access point 843 and the Internet 841. The set top box 821 subsequently retrieves the first multimedia element from the remote media broadcaster 851. The user input identified the parallel television 805. Hence, the set top box 821 sends the first multimedia element to the docking adapter 803 via the Internet 841 and the Internet access point 843. The docking adapter 803 receives the first multimedia element, carries it to the parallel television 805, and the parallel television 805 displays a video portion of the first multimedia element on the screen 807.

For example and without limitation, a second user input identifies the first multimedia element, the parallel television 805 and the removable storage 861. The docking adapter 803, in addition to performing previous operations, also carries the first multimedia element up to the port into which the removable storage 861 is inserted and stores the first multimedia element in the removable storage 861.

For example and without limitation, a third user input identifies the first multimedia element, the television 811 and the remote media storage 831. The docking adapter 803 receives a second control signal corresponding to the third user input from the parallel television 805 and sends it to the set top box 821 via the Internet access point 843 and the Internet 841. The set top box 821 subsequently retrieves the first multimedia element from the remote media broadcaster 851 and forwards it to the remote media storage 831 for storage. The third user input identified the television 811. Hence, the set top box 821 in addition sends the first multimedia element to the television 811. The television 811 displays a video portion of the first multimedia element on the television screen 813. In addition, the television 811 plays an audio portion of the first multimedia element on a television speaker.

For example and without limitation, a fourth user input identifies a second multimedia element that is available with the remote media storage 831, the parallel television 805 and the storage system 825. The docking adapter 803 receives a new control signal from the parallel television 805 generated by the parallel television 805 in response to the fourth user input and sends it to the set top box 821 via the Internet access point 843 and the Internet 841. The set top box 821 subsequently retrieves the second multimedia element from the remote media storage 831 and forwards it to the storage system 825 for storage. The set top box 821 sends the second multimedia element to the docking adapter 803 via the Internet 841 and the Internet access point 843. The docking adapter 803 receives the second multimedia element, carries it to the parallel television 805, and the parallel television 805 displays a video portion of the second multimedia element on the screen 807.

All or some of the plurality of multimedia elements available with the remote media broadcaster 851 are not free to use. The second multimedia element that is available with the remote media storage 831 is also not free to use. In some embodiments the docking adapter 803 provides credentials for the parallel television 805 and the docking adapter 803 to the set top box 821 to initiate communication with the set top box 821 and subsequent access to the some of the plurality of multimedia elements and the second multimedia element that are not free to use.

Figure 9:
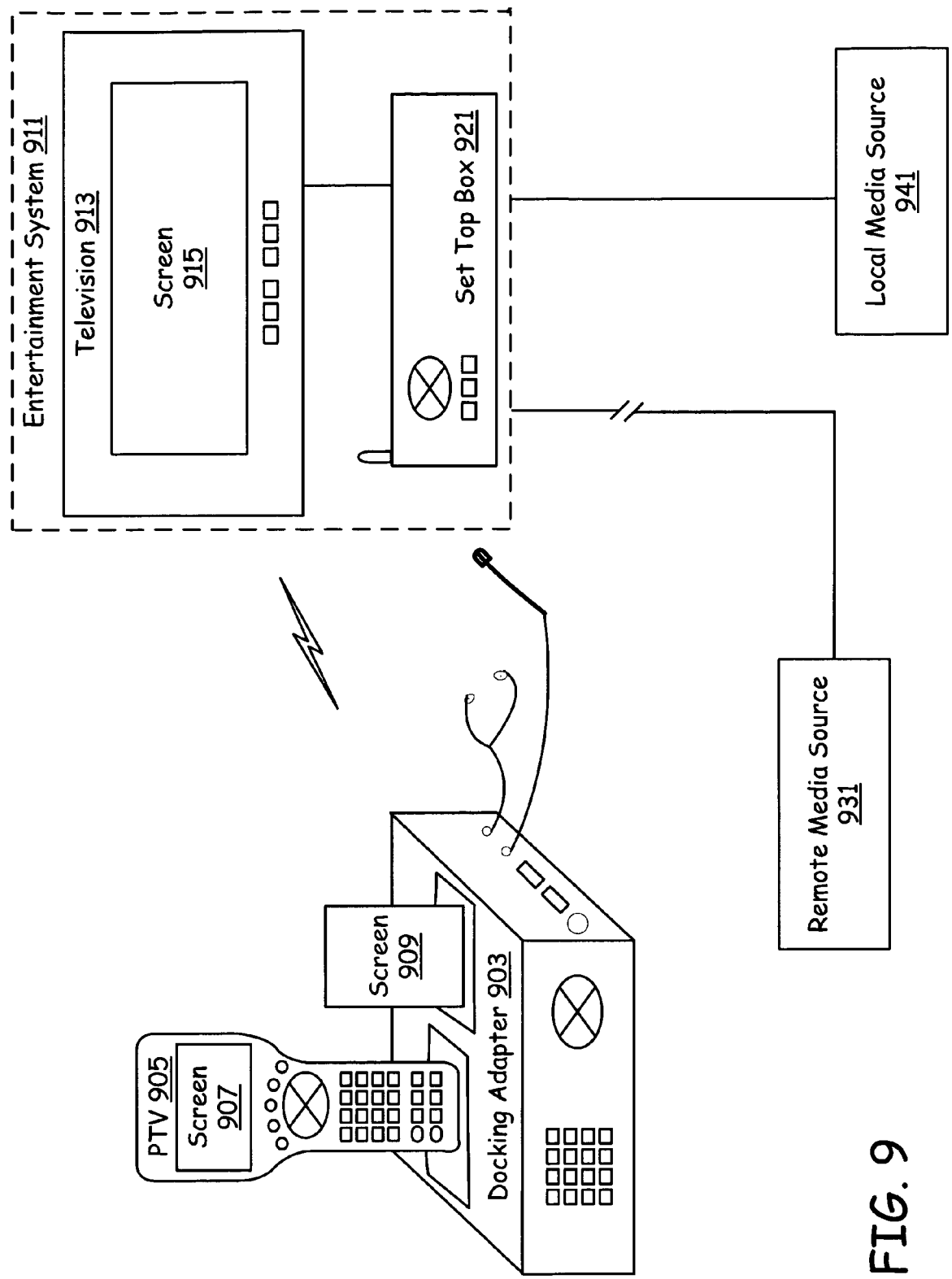
FIG. 9 is a schematic block diagram illustrating another embodiment of the docking adapter of FIG. 8 further supporting communication of the parallel television to the set top box over a wireless link; and, FIG. 10 is a perspective diagram illustrating yet another embodiment of the docking adapter of FIG. 9 further supporting communication to a wireless headphone, wherein the parallel television communicates with the wireless headphone directly or indirectly via the docking adapter.

FIG. 9 is a schematic block diagram illustrating another embodiment of the docking adapter 803 of FIG. 8 further supporting communication of the parallel television 905 to the set top box 921 over a wireless link. The docking adapter 903 comprises a socket, a PTV interface laid on the socket, a screen 909, a video driver, a user input interface, a speaker port, a microphone port and a wireless interface. The parallel television 905 comprises a docking adapter interface and a PTV screen 907. The parallel television 905 is inserted into the socket with the docking adapter of the parallel television 905 coming in physical contact with the PTV interface of the docking adapter 903 and consequently the parallel television 905 gets connected to the docking adapter 903. The parallel television 905 is slid into the socket for angled viewing of the PTV screen 907. In some embodiments, the parallel television 905 communicates with the docking adapter 903 via a wired link connecting the PTV interface and the docking adapter interface.

The docking adapter 903 communicates with the set top box 921 over the wireless link. The set top box 921 is connected to a television 913, a local media source 941 and a remote media source 931. The television 913 and the set top box 921 are located at a first premises. The local media source 941 is located at the first premises. The remote media source 931 is located at a second premises. The docking adapter 903 is located at a third premises. In some embodiments, the docking adapter 903 is located at the first premises. The remote media source 931 may typically be and without limitation an Internet server, an intranet server and a television channel broadcaster. The local media source 941 may typically be a PVR, a DVD player, a camcorder etc.

A microphone is plugged into the microphone port of the docking adapter 903. A speaker is plugged into the speaker port of the docking adapter 903. The docking adapter 903 comprises a communication pathway that interconnects the socket, the PTV interface, the video driver, the user input interface, the speaker port, the microphone port and the wireless interface. The user input interface of the docking adapter 903 comprises a rotating knob, a plurality of keys and the microphone. A user speaks out a voice message into the microphone. The docking adapter 903 deciphers the voice message and generates a first signal based on the voice message. The communication pathway of the docking adapter 903 carries the first signal up to the PTV interface. The parallel television 905 receives the first signal via the docking adapter interface. In another embodiment, the communication pathway of the docking adapter 903 carries the voice message to the PTV interface. The parallel television 905 receives the voice message via the docking adapter interface and generates the first signal based on the voice message.

The first signal identifies a first video available with the local media source 941. The parallel television 905 generates a second signal and sends the second signal to the docking adapter interface. The docking adapter 903 receives the second signal via the PTV interface, carries the second signal up to the wireless interface and sends the second signal to the set top box 921. The second signal directs the set top box 921 to retrieve the first video from the local media source 941 and forward the first video to the docking adapter 903. The docking adapter 903 receives the first video via the wireless interface, and carries the first video to the video driver using the communication pathway. The video driver of the docking adapter 903 displays the first video on the screen 909. In yet another embodiment, the docking adapter 903 delivers the first video to the PTV interface, and the parallel television 905 displays the first video on the PTV screen 907 of the parallel television 905.

The first signal may also identify a second video available with the local media source 941. The second signal in addition actuates the set top box 921 to retrieve the second video from the local media source 941 and forward the second video to the television 913 for display on television screen 915. In some embodiments the first signal identifies a multimedia element available with the local media source 941. The multimedia element comprises a video portion and an audio portion. The parallel television 905 generates a third signal and sends the third signal to the set top box 921 via docking adapter 903. The third signal triggers the set top box 921 to retrieve the multimedia element from the local media source 941 and forward the multimedia element to the docking adapter 903. The docking adapter 903 receives the multimedia element via the wireless interface, and carries the video portion of the multimedia element to the video driver using the communication pathway. The video driver of the docking adapter 903 displays the video portion of the multimedia element on the screen 909. The communication pathway carries the audio portion of the multimedia element to the speaker port. The docking adapter 903 plays the audio portion in the speaker plugged into the speaker port. The multimedia element is, for example and without limitation, a recorded audio-visual clip, a movie, an audio-visual game etc.

The docking adapter 903 comprises a power interface via which the docking adapter 903 receives power from a power supply. The power is one of an ac power supply and a dc power supply. The docking adapter 903 supplies-power received via the power interface to any or more of the video driver, the wireless interface, the speaker plugged into the speaker port, the microphone plugged into the microphone port, the parallel television 905, etc.

Figure 10:
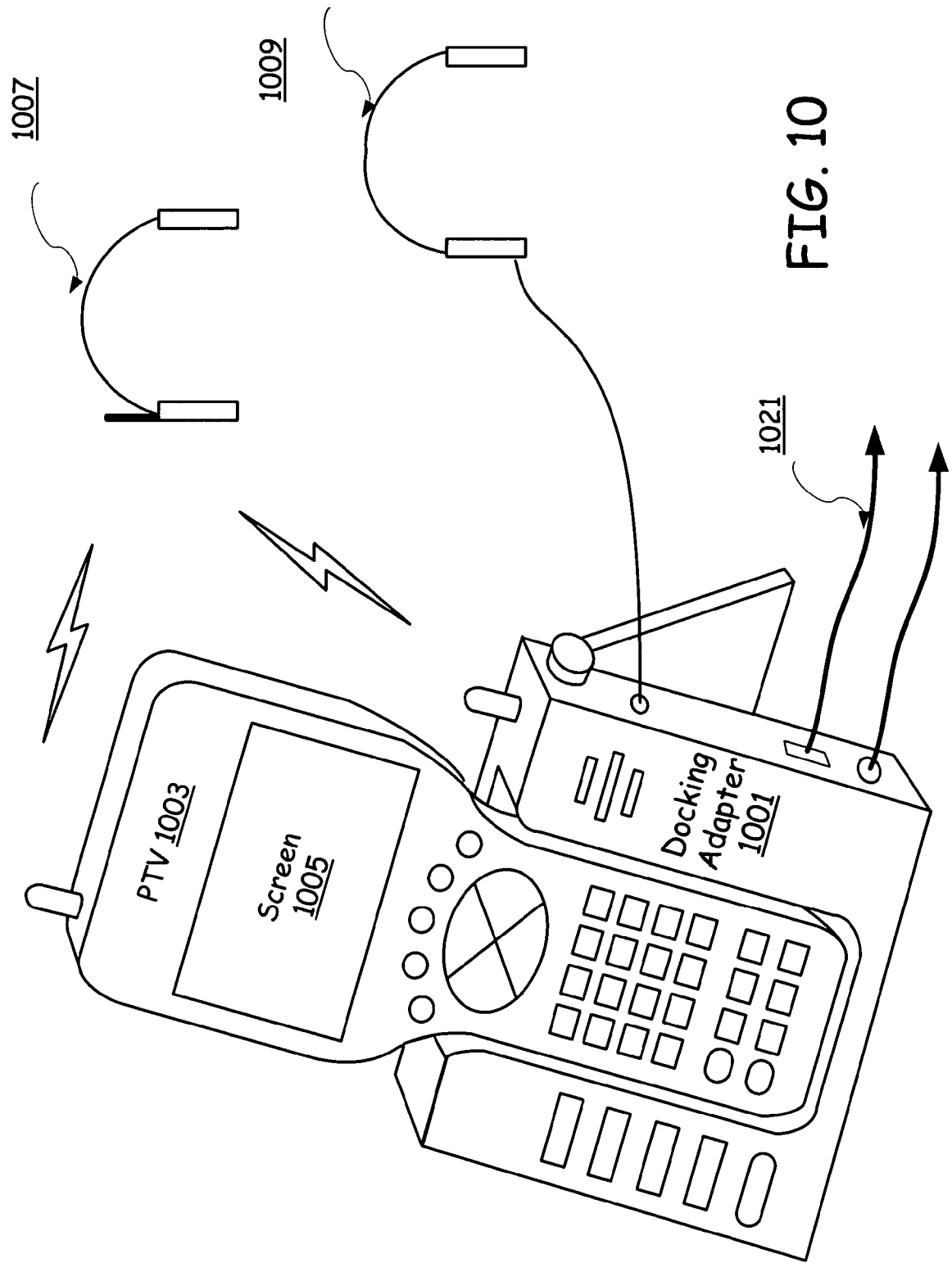

FIG. 10 is a perspective diagram illustrating yet another embodiment of the docking adapter 903 of FIG. 9 further supporting communication to a wireless headphone 1007, wherein the parallel television 1003 communicates with the wireless headphone 1007 directly or indirectly via the docking adapter 1001. The docking adapter 1001 comprises a wireless interface via which the docking adapter 1001 communicates with the wireless headphone 1007. The docking adapter 1001 comprises a headphone port. A wired headphone 1009 when plugged into the headphone port of the docking adapter 1001 communicates with the docking adapter 1001. The docking adapter 1001 comprises a socket cut into the chassis of the docking adapter 1001. The parallel television 1003 fits into the socket. The docking adapter 1001 comprises a PTV interface and a user input interface. The parallel television 1003 interacts with the docking adapter 1001 via the PTV interface. The parallel television 1003 comprises a PTV user input interface, a PTV wireless interface and a PTV screen 1005.

The docking adapter 1001 communicates with a media source over a wired link 1021. The media source supplies a plurality of multimedia elements. The plurality of multimedia elements may be stored in the media source. The user input interface of the docking adapter 1001 receives an input from a user. The docking adapter 1001 sends the input to the parallel television 1003 via the PTV interface. In some embodiments, the PTV user input interface receives the input from the user. The input identifies a multimedia element from the plurality of multimedia elements. The parallel television 1003 sends a signal to the docking adapter 1001 via the PTV interface to trigger the docking adapter 1001. The docking adapter 1001 subsequently interacts with the media source and receives the multimedia element from the media source over the wired link 1021. The docking adapter 1001 sends the multimedia element to the parallel television 1003 via the PTV interface. The parallel television 1003 displays a video portion of the multimedia element on the PTV screen 1005. The parallel television 1003 sends an audio portion of the multimedia element to the wireless headphone 1007 via the PTV wireless interface.

In some other embodiments, the docking adapter 1001, after receiving the multimedia element from the media source, sends the audio portion of the multimedia element to the wireless headphone 1007 via the wireless interface of the docking adapter 1001. The docking adapter 1001 carries only the video portion of the multimedia element to the parallel television 1003. The docking adapter 1001 alternately or in addition sends the audio portion of the multimedia element to the wired headphone 1009 via the headphone port of the docking adapter 1001.

As one of average skill in the art will appreciate, the term "communicatively coupled," as may be used herein, includes wireless and wired, direct coupling and indirect coupling via another component, element, circuit, or module. As one of average skill in the art will also appreciate, inferred coupling (i.e., where one element is coupled to another element by inference) includes wireless and wired, direct and indirect coupling between two elements in the same manner as "communicatively coupled".

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

We claim:

1. A home entertainment system that receives a channel guide and content from a plurality of television channels, the home entertainment system comprising:
    a television having a first screen that displays content from a first one of the plurality of television channels;
    a remote control device having a second screen that selectively displays the channel guide and content from a second one of the plurality of television channels; and
    a docking adapter configured to receive the remote control device, the docking adapter comprising:
        a communication interface configured to communicatively couple the docking adapter to the remote control device in response to at least a portion of the remote control device being inserted into the docking adapter; and
        a communication pathway configured to deliver to the remote control device via the communication interface the channel guide and the content from the second one of the plurality of television channels.

2. The home entertainment system of claim 1, wherein the docking adapter further comprises a user input interface adapted to receive a user input specifying a channel selection.

3. The home entertainment system of claim 1, wherein the docking adapter further comprises a power interface through which power is delivered to the remote control device from a battery of the docking adapter.

4. The home entertainment system of claim 1, wherein the docking adapter further comprises a wireless interface, and the docking adapter is adapted to receive the channel guide and the content from the second one of the plurality of television channels through the wireless interface.

5. A docking adapter for utilization with an entertainment system, the docking adapter comprising:
    a housing shaped for removable insertion of a parallel television device;
    a power input interface disposed on the housing;
    a power output interface, disposed on the housing, through which power is delivered to the parallel television device;
    a communications interface configured to communicatively couple the docking adapter to the remote control device in response to at least a portion of the parallel television device being inserted into the docking adapter; and
    a communication pathway configured to deliver to the parallel television device via the communication interface media flow comprising television channel broadcast content to the parallel television device.

6. The docking adapter of claim 5, wherein the communication pathway comprises an audio pathway, and the media flow comprises audio flow.

7. The docking adapter of claim 6, further comprising a speaker communicatively coupled to the audio pathway.

8. The docking adapter of claim 5, wherein the television channel broadcast content is formatted differently from television content presented on a television being controlled by the parallel television device.

9. The docking adapter of claim 5, further comprising an interface through which a media element is delivered from an IP-addressable device to the parallel television device.

10. A docking adapter for utilization with an entertainment system having a television and a parallel television device, the parallel television device controlling the television, the docking adapter comprising:
a housing shaped for removable insertion of the parallel television device, the housing supporting an adaptable mounting angle of the parallel television device;
a power input interface disposed on the housing that receives input power; and,
a power output interface through which output power is delivered to the parallel television device.

11. The docking adapter of claim 10, further comprising:
a communication interface configured to communicatively couple the docking adapter to the remote control device in response to at least a portion of the parallel television device being physically inserted into the docking adapter; and
a communication pathway configured to deliver media flow to the parallel television device via the communication interface.

12. The docking adapter of claim 11, further comprising an interface through which the docking adapter receives content from a television channel and sends control commands from the parallel television device to control display on the television.

13. The docking adapter of claim 11, further comprising a headphone port.

14. The docking adapter of claim 11, further comprising a screen.

15. A home entertainment system that receives content from a plurality of television channels, the home entertainment system having a television with a first screen, the home entertainment system comprising:
a control device configured to deliver commands causing the television to display content from a first one of the plurality of television channels on the first screen, wherein the control device comprises a second display that displays content from a second one of the plurality of television channels; and
a docking adapter that couples with the control device upon insertion of the control device into the docking adapter, wherein the docking adapter comprises a power interface that supports power delivery to the control device and a communication interface that provides television channel content to the control device.

16. The home entertainment system of claim 15, wherein the docking adapter comprises a communication pathway, and the communication pathway supports delivery of the commands from the control device to the television causing the television to display the content from the first one of the plurality of television channels on the first screen.

17. The home entertainment system of claim 15, wherein the docking adapter comprises a wireless interface, and an audio portion of the second one of the plurality of television channels is delivered to a wireless speaker via the wireless interface.

18. A method performed by a docking adapter that is coupled with a remote control device that comprises a first screen and a television that comprises a second screen, the method comprising:
receiving and communicating channel guide information to the remote control device for display on the first screen, where the channel guide information identifies a first television channel and a second television channel;
receiving and communicating a control signal from the remote control device that requests display of content from the first television channel on the second screen;
receiving and communicating a control signal from the remote control device that requests display of content from the second television channel on the first screen; and
receiving and communicating the content from the second television channel to the remote control device for display on the first screen.

19. The method of claim 18, comprising delivering power to the remote control device from a battery of the docking adapter.

20. The method of claim 18, wherein the received content from second television channel communicated to the remote control device has a different video format than the received content from the first television channel.

21. A method performed by a docking adapter in an entertainment system comprising a television and a parallel television device, wherein the parallel television device comprises a screen and is adapted to send control signals regarding the television, the method comprising:
receiving the parallel television device into an inserted position such that, when in the inserted position, the screen is not covered;
receiving input power through a power input interface;
delivering output power to the parallel television device;
receiving a television channel;
operatively coupling a communication interface of the docking adapter to the parallel television device upon insertion of the parallel television device, and
delivering content from the television channel to the parallel television device via the operatively coupled communication interface.

22. The method of claim 21, comprising receiving content from a second television channel and presenting the content from the second television channel on a display of the docking adapter.

23. The method of claim 21, further comprising delivering audio signals to a speaker of the docking adapter.

* * * * *

UNITED STATES PATENT AND TRADEMARK OFFICE
CERTIFICATE OF CORRECTION

| | | |
|---|---|---|
| PATENT NO. | : 7,932,959 B2 | Page 1 of 1 |
| APPLICATION NO. | : 11/289848 | |
| DATED | : April 26, 2011 | |
| INVENTOR(S) | : Bennett et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1164 days.

Signed and Sealed this
Fourth Day of October, 2011

David J. Kappos
*Director of the United States Patent and Trademark Office*